US010481774B2

(12) United States Patent
Lin et al.

(10) Patent No.: US 10,481,774 B2
(45) Date of Patent: Nov. 19, 2019

(54) AREA-DEPENDENT IMAGE ENHANCEMENT

(71) Applicant: Adobe Inc., San Jose, CA (US)

(72) Inventors: Zhe Lin, Fremont, CA (US); Byungmoon Kim, Sunnyvale, CA (US); Yuan Gao, Changde (CN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/291,462

(22) Filed: Oct. 12, 2016

(65) Prior Publication Data

US 2017/0031571 A1 Feb. 2, 2017

Related U.S. Application Data

(63) Continuation of application No. 14/550,808, filed on Nov. 21, 2014, now Pat. No. 9,471,966.

(51) Int. Cl.
*G06K 9/40* (2006.01)
*G06F 3/0484* (2013.01)
*G06T 5/00* (2006.01)
*G06F 3/041* (2006.01)
*G06F 3/0488* (2013.01)
*G06F 3/0481* (2013.01)

(52) U.S. Cl.
CPC .......... *G06F 3/04845* (2013.01); *G06F 3/041* (2013.01); *G06F 3/0488* (2013.01); *G06F 3/04817* (2013.01); *G06F 3/04847* (2013.01); *G06F 3/04883* (2013.01); *G06T 5/001* (2013.01); *G06T 5/002* (2013.01); *G06T 5/003* (2013.01); *G06T 2200/24* (2013.01)

(58) Field of Classification Search
CPC ............ G06T 5/20; G06T 2207/20172; H04N 1/00307; G06K 9/00013
See application file for complete search history.

(56) References Cited

U.S. PATENT DOCUMENTS

| 7,082,211 | B2* | 7/2006 | Simon | G06K 9/00281 358/531 |
| 7,362,368 | B2* | 4/2008 | Steinberg | H04N 5/232 348/345 |
| 7,564,585 | B2* | 7/2009 | Berkner | H04N 1/405 358/1.9 |
| 8,228,560 | B2* | 7/2012 | Hooper | G06T 5/20 348/606 |
| 8,755,623 | B2* | 6/2014 | Du | G06K 9/00228 382/167 |

(Continued)

OTHER PUBLICATIONS

"Pre-Interview Communication", U.S. Appl. No. 14/550,808, dated Mar. 23, 2016, 19 pages.

(Continued)

*Primary Examiner* — Jayesh A Patel
(74) *Attorney, Agent, or Firm* — SBMC

(57) ABSTRACT

This document describes techniques and apparatuses for area-dependent image enhancement. These techniques are capable of enabling selection, through a touch-enabled mobile-device display, of an area of a photographic image through movement of a spatially-variable implement, such as brush icon moved over the image. Selected areas can be enhanced differently than other areas, such as to apply sharpening to the selected area and blurring to a non-selected area.

20 Claims, 10 Drawing Sheets

(56) References Cited

U.S. PATENT DOCUMENTS

| | | | | |
|---|---|---|---|---|
| 9,471,966 B2* | 10/2016 | Lin | ............... | G06T 5/003 |
| 2007/0036456 A1* | 2/2007 | Hooper | ............... | G06T 5/20 |
| | | | | 382/274 |
| 2008/0131019 A1* | 6/2008 | Ng | ............... | G06T 5/50 |
| | | | | 382/255 |
| 2008/0239373 A1* | 10/2008 | Suzuki | ............... | G06F 3/1208 |
| | | | | 358/1.15 |
| 2008/0285853 A1* | 11/2008 | Bressan | ............... | G06T 5/009 |
| | | | | 382/169 |
| 2008/0298704 A1* | 12/2008 | Nachlieli | ............... | G06T 5/003 |
| | | | | 382/254 |
| 2009/0003723 A1* | 1/2009 | Kokemohr | ............... | G06T 5/002 |
| | | | | 382/261 |
| 2009/0079842 A1 | 3/2009 | Wilson | | |
| 2009/0177301 A1* | 7/2009 | Hayes | ............... | G11B 19/025 |
| | | | | 700/94 |
| 2009/0256947 A1* | 10/2009 | Ciurea | ............... | G06F 3/0488 |
| | | | | 348/333.12 |
| 2012/0321210 A1* | 12/2012 | Forbes | ............... | G06T 11/20 |
| | | | | 382/254 |
| 2013/0121606 A1* | 5/2013 | Chien | ............... | G06T 5/005 |
| | | | | 382/260 |
| 2015/0095804 A1* | 4/2015 | Grossman | ............... | G06F 3/0482 |
| | | | | 715/753 |
| 2015/0325008 A1* | 11/2015 | Scarff | ............... | G06T 11/001 |
| | | | | 345/605 |
| 2016/0148352 A1 | 5/2016 | Lin et al. | | |

OTHER PUBLICATIONS

"Notice of Allowance", U.S. Appl. No. 14/550,808, dated Jun. 15, 2016, 8 pages.

* cited by examiner

AREA-DEPENDENT IMAGE ENHANCEMENT

RELATED APPLICATIONS

This application is a continuation of U.S. patent application Ser. No. 14/550,808, filed Nov. 21, 2014, entitled "Area-Dependent Image Enhancement" to Zhe Lin, et al., the disclosure of which is hereby incorporated by reference herein in its entirety.

BACKGROUND

As digital photographic images become more and more prevalent, techniques have been developed to allow users to alter these images through various computational enhancements, such as blurring, sharpening, and so forth. These computational enhancements are often performed by applying a particular enhancement parameter to all of a photographic image. The result is a new data file representing a new, enhanced version of the photographic image after application of the desired parameter.

While these all-image enhancements are often useful, in some situations users desire to enhance particular areas of a photographic image. To address this desire, some techniques provide a limited solution that allows users to sharpen a selection of a photographic image. These techniques perform a relatively small sharpening enhancement with each selection and, by repeating this enhancement, continue to sharpen until the user is satisfied. This sharpening is relatively small, adding a small amount of sharpening with each selection because the enhancement is often destructive to the image, meaning that the sharpening is difficult or impossible to reverse. This relatively small sharpening in turn can result in a poor user experience due to the many selections needed by users to gain the desired sharpening. Furthermore, this limited solution is generally memory and processor intensive for computing devices on which it is performed.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for area-dependent image enhancement. These techniques are capable of enabling selection, through a touch-enabled mobile-device display, of an area of a photographic image through movement of a spatially-variable implement, such as brush icon moved over the image. Selected areas can be enhanced differently than other areas, such as to apply brightening to the selected area and blurring to a non-selected area.

The techniques are also capable of enhancing a selected area through a parameter selector, such as to select an area and then select a slider-bar control to view different amounts of enhancement to the area based on an amount of the parameter selected through the slider-bar control. This can enable a quick-and-easy user experience to discover a final, desired level of enhancement.

Furthermore, in some cases the techniques perform image enhancements through mapping of parameters to the various areas of the photographic image. The techniques create a parameter map for an image with areas having different parameters corresponding to different areas of the image. This parameter map can be used to enhance the photographic image without necessarily destroying the original image or its data file, instead the map is usable in conjunction with the original image. This is one of the ways that the techniques enable a user to creatively adjust various parameters to customize a photographic image without permanently altering the image itself.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

This disclosure describes techniques and apparatuses capable of area-dependent image enhancements. These enhancements can be selected through various manners to allow robust and flexible customization of photographic images. Furthermore, these techniques and apparatuses can enable these enhancements with a quick-and-easy user experience, even when made through a touch-enabled display of a mobile device.

In various examples set forth below, the techniques enable selection of areas of a photographic image, selection of parameters for the selected area, and creation of parameter maps having selected parameters. By so doing, users may customize their photographic images in new and robust ways, some of which preserve the original image for later use. Other aspects of the techniques, such as altering selected areas based on edge, border, or visual elements in the photographic image, as well as applying transition parameters to areas adjacent to the selected area, are also described.

The discussion now turns to an operating environment, techniques that may be employed in the operating environment, and an example device in which components of the operating environment can be embodied. In the discussion below, reference is made to the operating environment by way of example only.

Operating Environment

Figure 1:
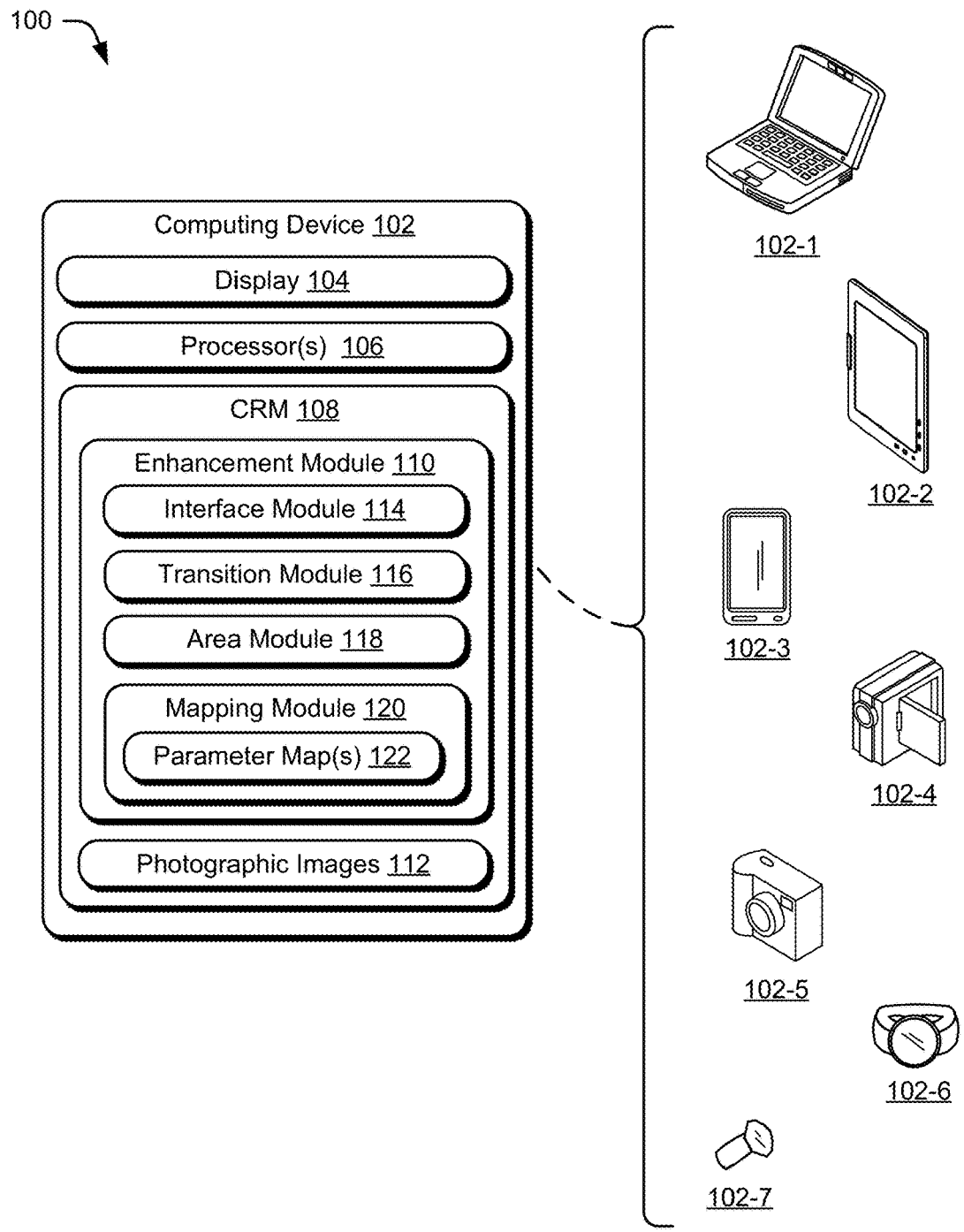
FIG. 1 illustrates an operating environment in which techniques for area-dependent image enhancement can be implemented.

FIG. 1 illustrates an example environment 100 in which techniques enabling area-dependent image enhancement can be implemented. Environment 100 includes a computing device 102 having a display 104, one or more computer processors 106, and computer-readable media (CRM) 108.

The techniques can be performed and the apparatuses embodied on one or a combination of the illustrated devices, such as on multiple computing devices, whether remote or local. Thus, a user's smart phone may capture (e.g., take photos or video) photographic images, pass them to another device (e.g., through a communication network), and that other device perform part or all of the techniques. Furthermore, a remote device may perform some operations for another device, such as a remote server performing enhancements responsive to receiving, from a user's mobile device, various area or parameter selections. This server then passes the enhancements to the user's mobile device. In many of the examples described below, which are not intended to limit application of the techniques, modules operating on a mobile device that captured the photographic image perform the techniques, rather than a remote device.

In more detail, CRM 108 includes enhancement module 110 and photographic images 112. Enhancement module 110 enhances areas of photographic images 112, such as a face of a child to have higher color contrast and sharpness, the child's clothes with a lesser sharpness and de-noised, and other areas to be blurry. Enhancement module 110 may enhance different areas with different types of enhancements, such as to blur, sharpen, de-noise, increase or decrease color contrast, brighten, darken, increase or decrease color hue, increase or decrease color saturation, convert to color, convert to black and white, or convert to sepia, to name but a few possible image enhancements. Note also that each of these enhancements may have a range or level of enhancement through use of a parameter value for the enhancement, such as to sharpen more or less, brighten only slightly or much, and so forth.

Enhancement module 110 includes an interface module 114, a transition module 116, an area module 118, and a mapping module 120. Interface module 114 is capable of enabling selection of one or more areas of a photographic image, such as through gestures made on a mobile touch-enabled display or through movement of a mouse pointer for a non-touch display. Interface module 114 may do so by providing a spatially-variable implement, which a user may then move over a displayed, photographic image effective to select an area of the photographic image. This spatially-variable implement can include a visual pointer that is shown moving with the user's movement over the photographic image. Further, this selected area can be shown by leaving a trace or other indicator to show the area over which the implement is moved or performing the desired image enhancement in real time as the area is selected. This spatial variability permits an arbitrary or discretionary movement by a user, rather than previously determined blocks or squares over the image. Interface module 114 is also capable of providing a moveable display region through which enhancements can be presented. This capability is described in greater detail below.

Transition module 116 is capable of determining a transition area adjacent to or surrounding a selected area, or between the selected area and a non-selected area. With this transition area, transition module 116 may apply another parameter for an image enhancement selected for the selected area. This other parameter may act to soften an otherwise abrupt transition from the selected area to other areas. Examples include a parameter value that is less than that of the selected area, e.g., a less-sharpened or reduced color contrast to that of the selected area.

Area module 118 is capable of altering a selected area. An area selected in a photographic image can be imprecise. In some cases this imprecision is but a few pixels and in some other cases is much larger. While the techniques may require users to carefully select the area, the techniques, through computations performed by area module 118, may instead alter the area to fit a likely desired element of the photographic image. Thus, a selected area can be altered by enlarging, reducing, and so forth, such as to enlarge the selected to fit an edge, border, or visual element detected within the photographic image. This is described in greater detail below.

Mapping module 120 is capable of applying, to a parameter map 122 corresponding to one of photographic images 112, a parameter value to a parameter map area corresponding to a selected area of photographic image 112. Mapping module 120 may apply a single parameter to a single area for each parameter map, or may have varying parameters for different areas of the parameter map. By so doing, one or many selected areas can be enhanced in various manners by applying a parameter for a particular enhancement to a selected area, such as in separate stages for different maps or through a single map having one or multiple parameters Enhancement module 110 may apply these parameter maps 122 on an original or previously enhanced version of photographic image 112, thereby enabling non-destructive image enhancements.

As shown in FIG. 1, computing device 102 can be one or a combination of various devices, here illustrated with seven examples: a laptop computer 102-1, a tablet computer 102-2, a smartphone 102-3, a video camera 102-4, a camera 102-5, a computing watch 102-6, and a computing ring 102-7, though other computing devices and systems, such as televisions, desktop computers, netbooks, and cellular phones, may also be used. As will be noted in greater detail below, in some embodiments the techniques operate through computing device 102 or a remote device. If operations are performed remotely, computing device 102 may forgo performing some of the computing operations relating to the techniques, and thus need not be capable of advanced computing operations.

These and other capabilities, as well as ways in which entities of FIG. 1 act and interact, are set forth in greater detail below. These entities may be further divided, combined, and so on. The environment 100 of FIG. 1 illustrates some of many possible environments capable of employing the described techniques.

Example Methods for Area-Dependent Image Enhancement

As noted above, the techniques enable area-dependent image enhancement. The following methods are described in part using entities of FIG. 1, though this is for example only. Methods described herein can be performed by one or multiple entities, and be combined, in whole or in part. The order shown for operations performed is for example only, and is not intended to limit the techniques.

Figure 2:
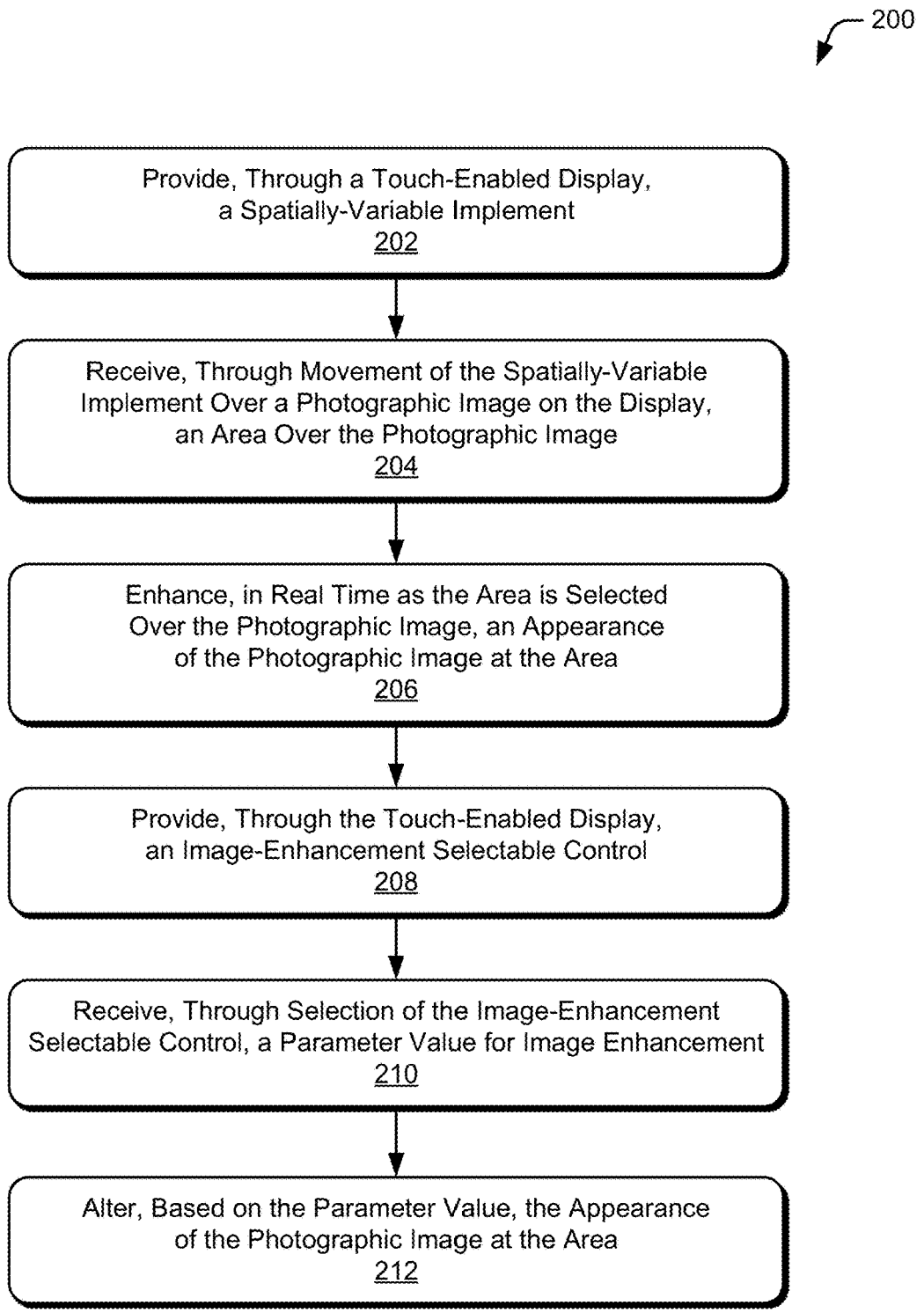
FIG. 2 illustrates an example method that enables area-dependent image enhancement through areas selected through movement of a spatially-variable implement over a photographic image on a touch-enabled display.

FIG. 2 illustrates an example method 200, which enables area-dependent image enhancement through areas selected through movement of a spatially-variable implement over a photographic image on a touch-enabled display.

At 202, a spatially-variable implement is provided through a touch-enabled mobile-device display on which a photographic image is presented. While the techniques generally do not require this manner of selecting an area for image enhancement, this is one way in which such selection can be made. As noted above, this implement can be a visual pointer capable of arbitrary movement. In some cases this implement is a brush icon movable over the photographic image through touch-enabled gestures.

At 204, a selected area of the photographic image is received through movement of the spatially-variable implement over the photographic image presented on the touch-enabled mobile-device display. As noted above, operations 202 and 204 can be performed using interface module 114, including through various selection manners.

Figure 3:
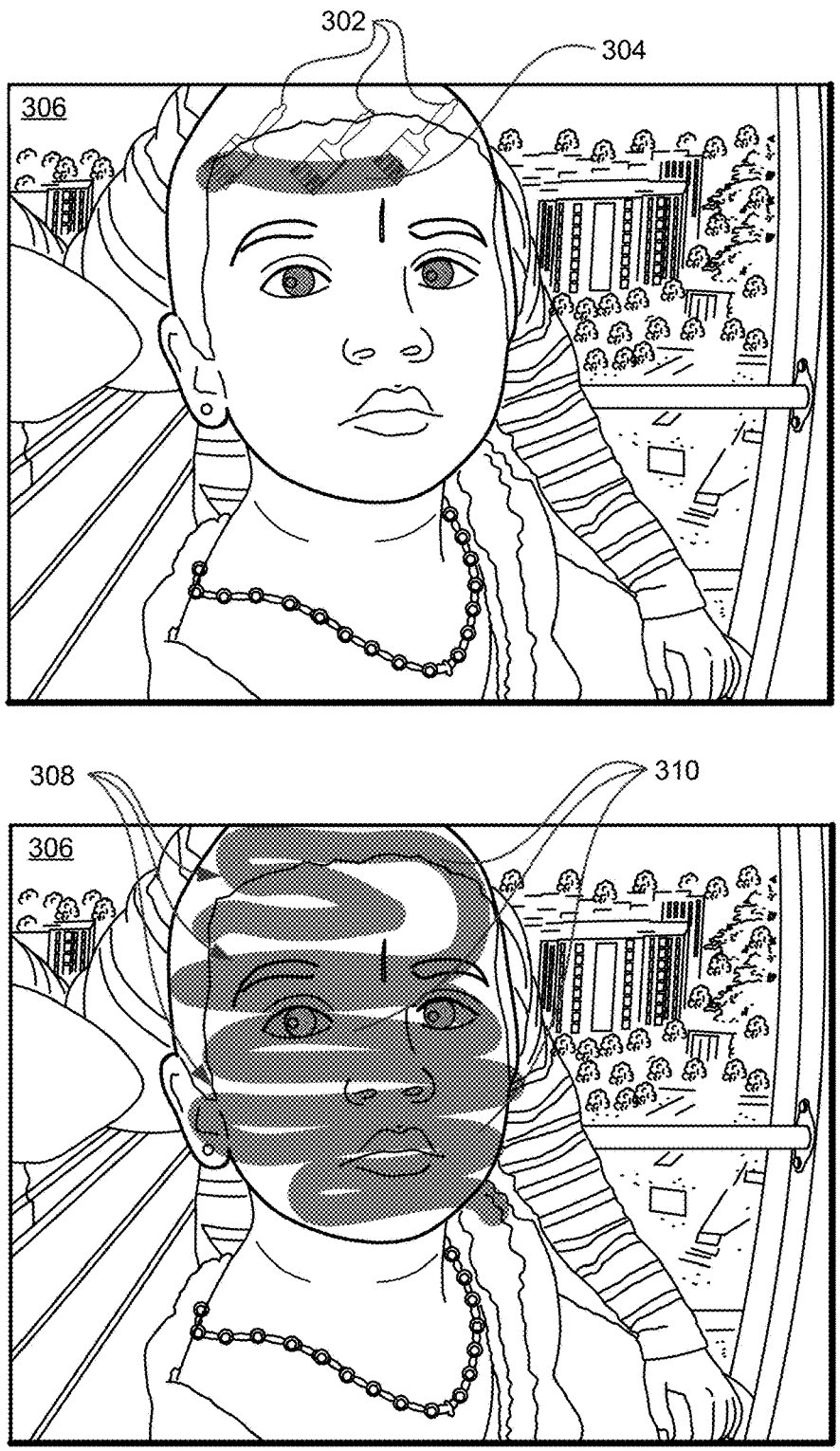
FIG. 3 illustrates a brush implement moving along a path over a photographic image to select an area of the photographic image for image enhancement.

By way of example, consider FIG. 3, which illustrates a brush implement 302 moving along path 304 over photographic image 306. This path 304 selects an area. The photographic image under this area can be enhanced by the techniques in real time as the area is selected. As will be noted later below, path 304 (or additional paths) can be made by a user to select a small or large area and for which enhancements that are made can be altered. As shown in FIG. 3, the user eventually selects a larger area 308 of photographic image 306, which can be enhanced as the user moves brush implement 302. Larger area 308 is shown with multiple paths 310 (one of which includes path 304) made through movement of brush implement 302.

Figure 4:
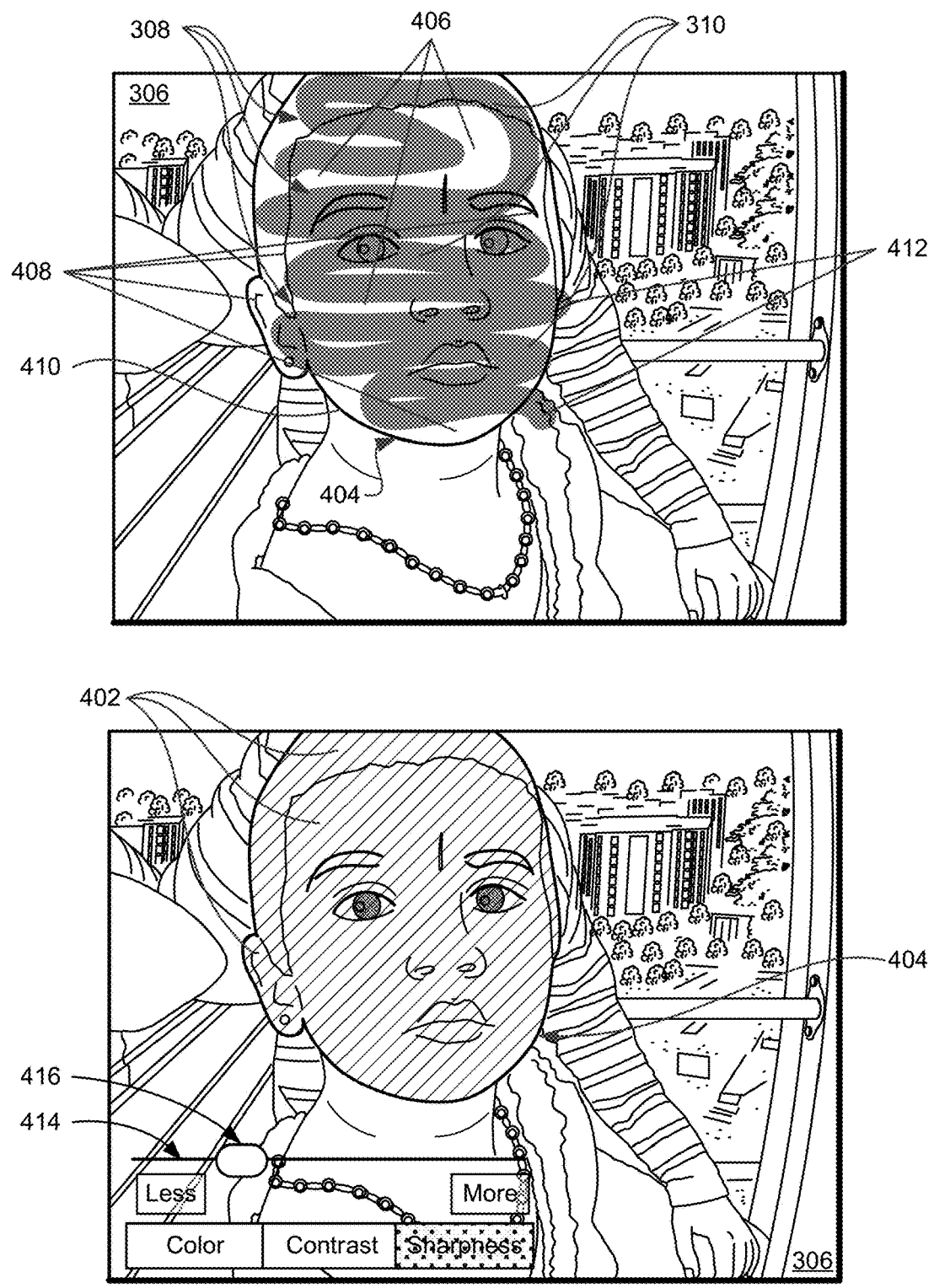
FIG. 4 illustrates a selected area and an altered area.

In some cases, the techniques alter the area. This can be performed either automatically or responsive to a user's selection. This is shown in FIG. 4, which illustrates larger area 308 and an altered area 402 altered by area module 118 of FIG. 1 (altered area 402 shown with diagonal lines). As noted in part above, area module 118 is capable of altering a selected area (e.g., path 304, paths 310, and/or larger area 308) prior to, after, or as that area is being enhanced. This alteration can be to enlarge or reduce based on an edge, border, or visual element detected within the photographic image or to fill in spaces between paths of a selected area. Consider path 304 of FIG. 3 for example. The techniques can expand or contract or otherwise alter the area under path 304, such as to expand to an edge of a visual element or reduce (e.g., truncate) part of path 304 based on the visual element. Visual elements, borders, and so forth can be determined through analysis of a photographic image in various manners known in the art.

In more detail, consider larger area 308 of FIG. 3. Here area module 118 determines that larger area 308 covers much of a particular visual feature—that of the girl's face (face 404), but that some spaces 406 exist between paths 310 (only three shown for visual brevity), some spaces 408 exist between paths 310 and a border 410 for face 404 (only four shown for visual brevity), and that some portions 412 of larger area 308 are over border 410 of face 404. Area module 118 then fills in these spaces and removes portions 412 to create an altered, selected area for image enhancement. While altering a selected area is not required, by so doing the techniques often permit a better user experience, especially in cases where a user is in a hurry or is using a smaller interface (e.g., that of a smartphone). Note also that this altering can be performed in real time as the enhancement is being made, though that is not required.

At 206, the appearance of the photographic image at the area is enhanced. This can be performed in real time as the area is selected over the photographic image, e.g., as path 304 of FIG. 3 is received, though it may also or instead be enhanced at some point after selection. Thus, enhancement module 110 may enhance an area in real time as it is received or at some later point, such as larger area 308 of FIG. 3 or altered area 402.

At 208, an image-enhancement selectable control is provided through the touch-enabled mobile-device display. In cases where a range of possible parameters can be selected, enhancement module 110 may provide, through interface module 114, a selectable control to enable selection of the desired parameter. An example of a selectable control is shown in FIG. 4 at slider control 414.

At 210, a parameter value for an image enhancement is received through selection of the image-enhancement selectable control. As shown at slider control 414, a user may select a range of different color, contrast, or sharpness (sharpness is selected) to enhance face 404 of photographic image 306. This example selection is through movement of a button 416 along slider control 414 (from less to more enhancement as shown). In some cases the enhancement can be performed in real time as the user alters the parameter, thereby permitting users to quickly select a desired enhancement by which to alter an enhancement made, such as in real time at block 206. This selection is not required, however, as it may be by default, though this or various other manners for selection of a parameter for an image enhancement can permit a user to quickly view various different levels of image enhancement by which to select the desired amount of enhancement.

At 212, an appearance of the photographic image at the selected area is altered. This alteration to the enhancement can be based on the parameter value selected through the image-enhancement selectable control. Examples include altering an enhancement made at block 206, or altering a global enhancement, such as to remove a global enhancement made to all of the photographic image from the selected area.

Concluding the ongoing example, after enhancement was made at block 206 and after selection of an area (here altered to include face 404) and a parameter through button 416 on slider control 414, a desired sharpness for the girl's face 404 is made by enhancement module 110.

An noted in part above, the techniques may perform an image enhancement at the area but temporarily, and thus permit selection to review the enhancement (e.g., reduce or reverse the sharpness for face 404 of photographic image 306). Further, this enhancement can be presented without altering an original image file for the photographic image. In some cases this is performed through use of parameter map 122, which is further described below.

Figure 5:
FIG. 5 illustrates other selected areas of the photographic image of FIGS. 3 and 4, a girl's dress and a background.
Figure 5:
Figure 6:
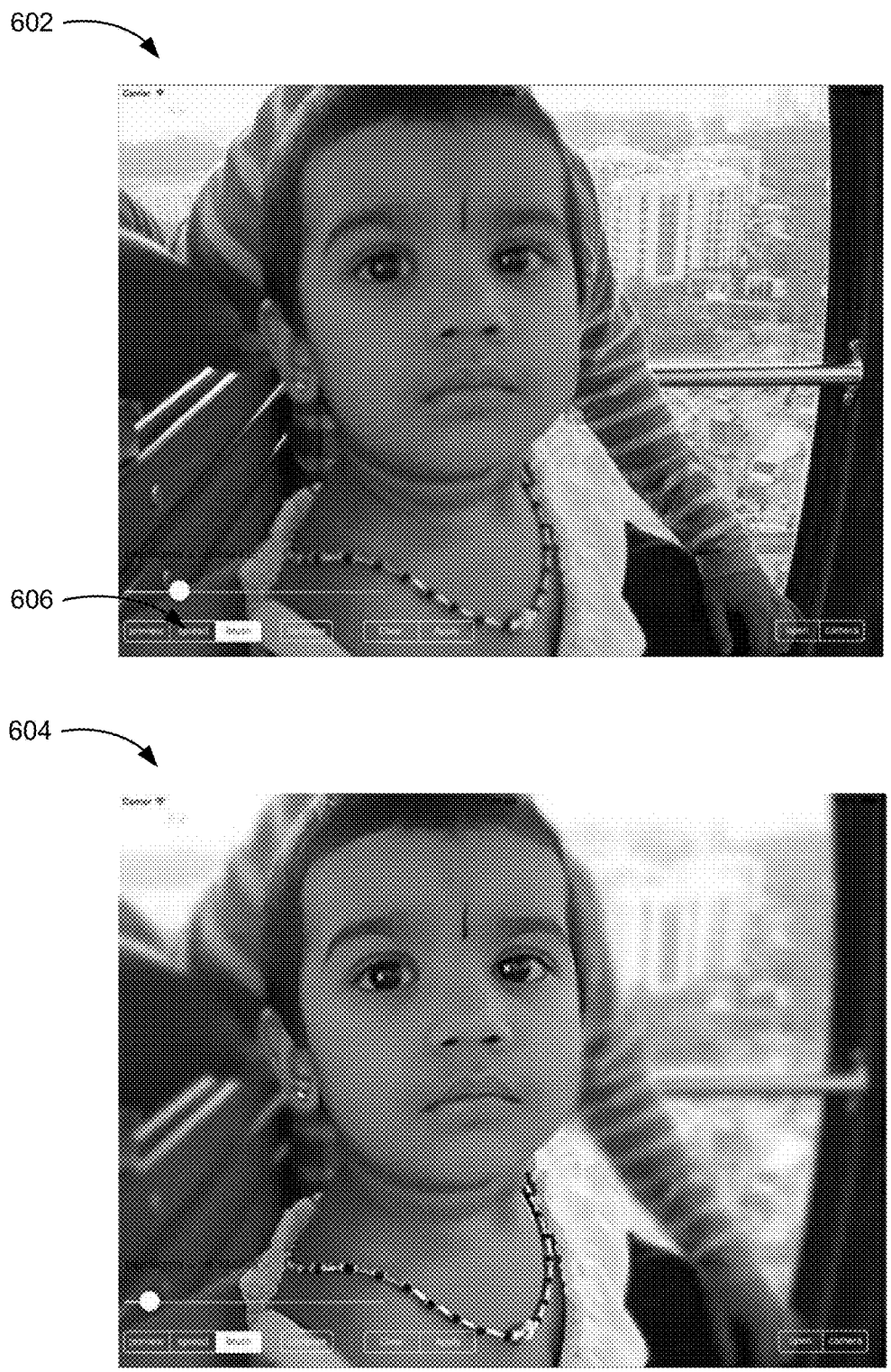
FIG. 6 illustrates an original photographic image and a post-enhancement photographic image.

Note also that this and other methods set forth herein can be repeated effective to alter different selected areas with different enhancements, or to perform multiple enhancements on various areas, whether or not those areas overlap with other areas. By way of example, consider FIG. 5, which illustrates two other selected areas of photographic image 306, the girl's dress 502 and background 504. Background 504 can be selected in the manners noted above (e.g., a spatially-varying implement, etc.) or by negation—meaning a selection to enhance areas not yet selected. Here assume that face 404 is selected to be sharpened and brightness increased, that dress 502 is selected to be sharpened, that background 504 is selected to be blurred, and that all of the image is selected to be de-noised. Actual results are shown in FIG. 6, which shows original photographic image 602 and post-enhancement photographic image 604. Further, while shown as selected areas, selection of these areas can be performed in various manners, and enhancements made in real time, such as shown in FIG. 3.

Figure 7:
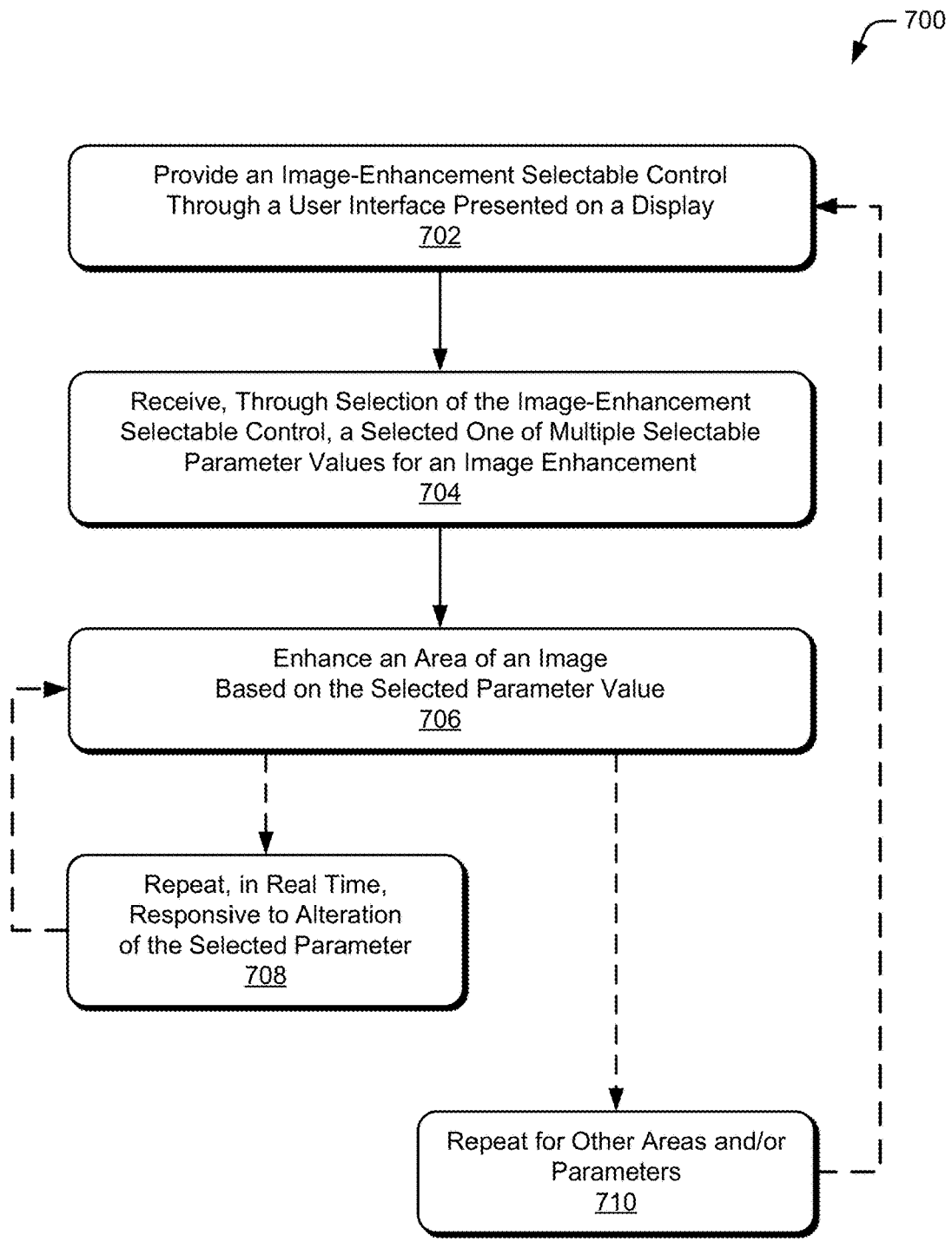
FIG. 7 illustrates an example method in which the techniques may perform image enhancement according to selected parameter values.

With the above method and examples set forth, the discussion now turns to method 700 of FIG. 7, in which the techniques may perform image enhancement according to selected parameter values. Method 700 can operate separate from, in conjunction with, in whole or in part, or augment method 200 above.

At 702, an image-enhancement selectable control is provided through a user interface presented on a display. This image-enhancement selectable control includes selectable parameter values for an image enhancement to an area of a photographic image, such as a range of values for a selected image enhancement. An example of one such control is slider control 414 of FIG. 4, though many others may instead be used.

At 704, a selected one of the multiple selectable parameter values for the image enhancement to the area of the photographic image is received through selection of the image-enhancement selectable control. An example of this is described above through movement of button 416 on slider control 414 of FIG. 4.

At 706, the area of the photographic image is enhanced based on the selected parameter value. As noted, this can be responsive to the selection of the selected parameter value.

Optionally, at 708, the enhancement of operation 706 can be repeated, even in real time, responsive to receiving an alteration to the selected parameter. Continuing the above example, enhancement module 110 can change an enhancement in real time responsive to a user moving button 416 along slider control 414.

Also optionally, at 710, operations of method 700 can be repeated for other areas and/or parameters. Thus, method 700 can be performed multiple times for multiple areas and parameters, which may or may not overlap. One area may be sharpened a particular amount based on a selected sharpness parameter and another area overlapping the first area be brightened or given an increased color contrast. This is but one example of the way in which the techniques enabled area-dependent image enhancement to allow users to enhance their images in a customizable and easy-to-use manner.

In some cases, interface module 114 of enhancement module 110 enables a preview of the various enhancement for a particular parameter, even if an area to be enhanced has not yet been selected. This can be done through a display region, which may be a window, box, square, rectangle, circle, or other shaped region. This display region can be selectable to move freely over the photographic image and show an un-enhanced, prior enhanced, or alternative enhancement within the display region. Thus, a user may want to view various different enhancements or different types of enhancements. While these may be shown over an entirety of the photographic image, showing a movable window with the enhancements provides a contrast and comparison between the enhancement in the display region and other areas of the photographic image that are not similarly enhanced. It can also use fewer processing or memory resources than showing an enhancement for the entirety of the photographic image. Further still, a user may use this to see which area to select based on which area benefits from the particular enhancement displayed in the moveable display region.

In more detail, the display region can be a size less than a size of the area of the photographic image, show an un-enhanced, prior enhanced, or alternative enhancement (even in real time as the display region is moved), or show an alternative enhancement to a selected region having an enhancement (e.g., showing a reduced or increased parameter value relative to the selected parameter value of the current enhancement).

Figure 8:
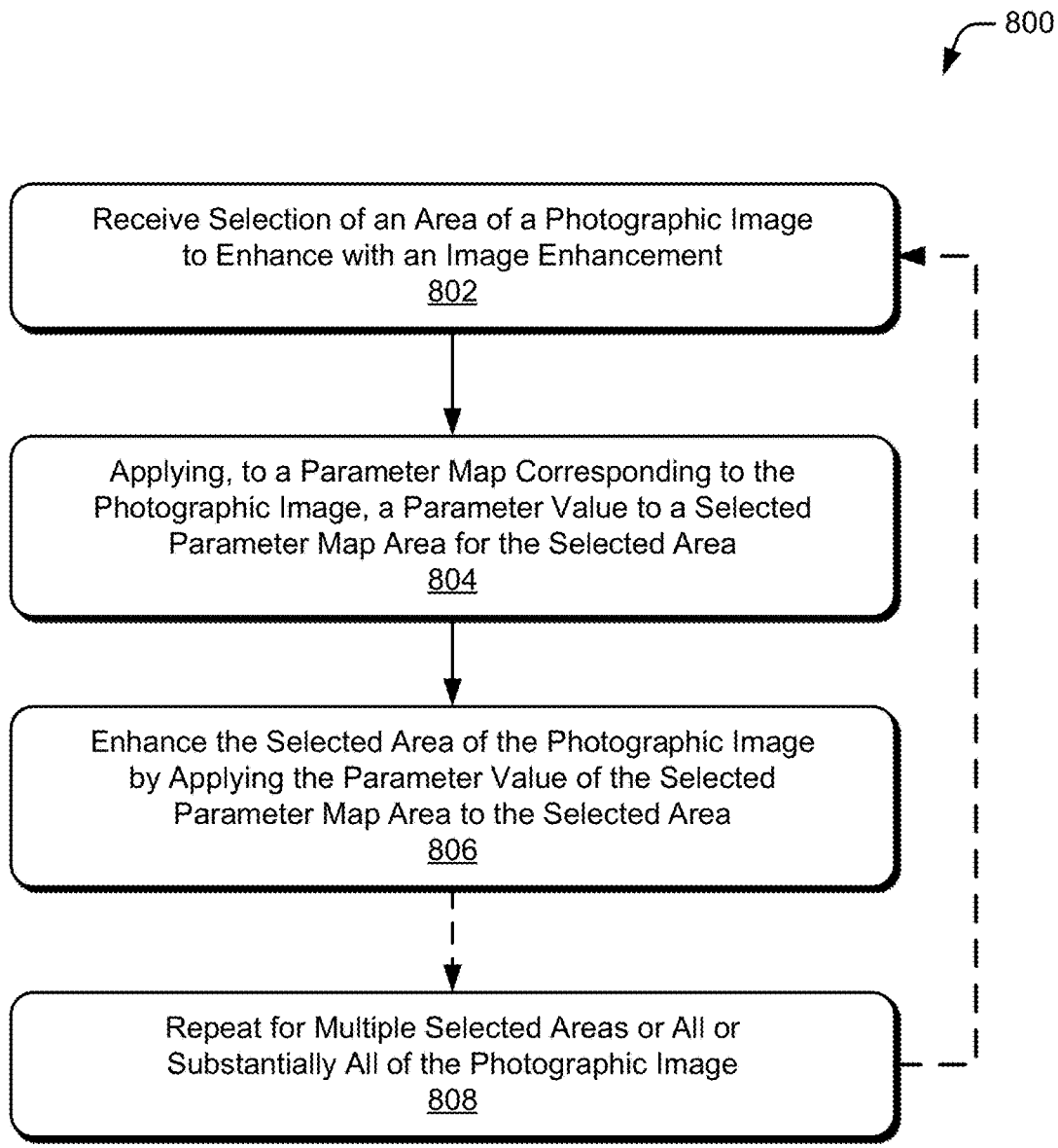
FIG. 8 illustrates an example method for performing area-dependent image enhancements using one or more parameter maps

As noted in part above, the techniques may perform area-dependent image enhancements using one or more parameter maps. This is illustrated and described below as part of method 800 of FIG. 8. Method 800 can operate separately from, or be used in whole or in part in conjunction with, methods 200 and 700.

At 802, a selection of an area of a photographic image to enhance with an image enhancement is received. This can be received in the various manners described above.

Figure 9:
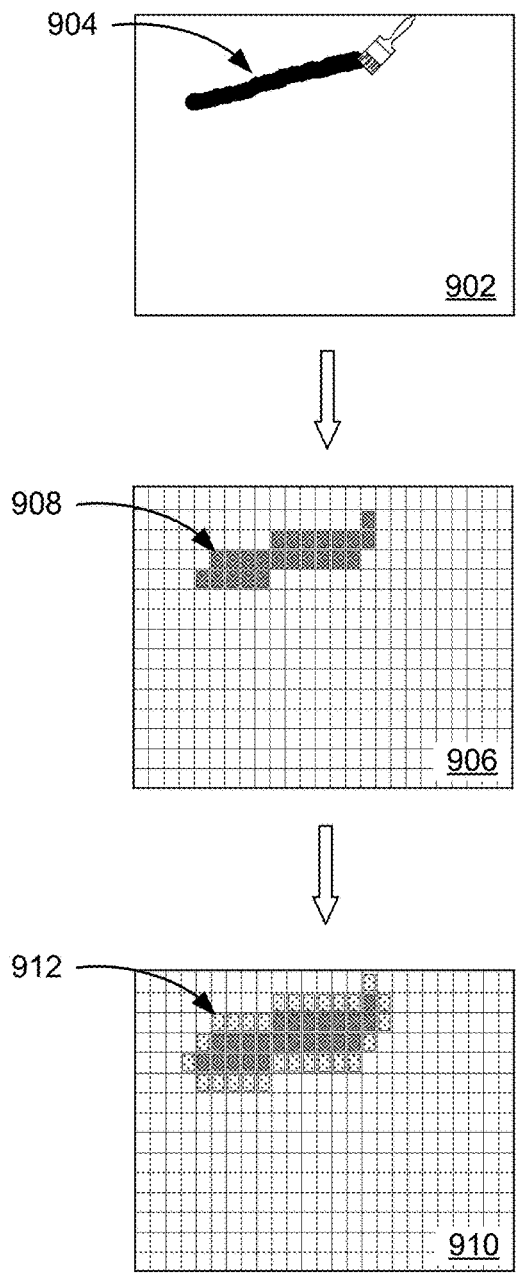
FIG. 9 illustrates a display on which selection of an area is made and two parameter maps.

At 804, a parameter value is applied to a parameter map area corresponding to the selected area of the photographic image, such as by mapping module 120. By way of example, consider FIG. 9, which illustrates a display 902 (photographic image omitted) on which selection of an area 904 is made and a parameter map 906 showing a simplified, grid layout for a parameter map area 908 corresponding to area 904.

As noted above, a transition area can be determined for a selected area by transition module 116. This can aid in providing a smoother transition between enhancements. In such a case, transition module 116 may assign a transition area surrounding the selected area or between the selected area and non-selected areas of the photographic image, such as to parameter map 910 at transition area 912, a less-intensive parameter compared to that of the selected area. Thus, assume that a color contrast for parameter map area 908 is medium-high, the color contrast for transition area 912 is instead medium or medium low (assuming that the image itself is low or no color contrast enhancement). Transition module 116 may assign a transition area through extrapolation, through a certain number of pixels surround the selected area, or be based on borders and visual elements of the photographic image. Thus, for sharpening face 404 of FIG. 4, if the area selected is precisely within the border of the face, the transition area may be determined to be relatively small. If instead it is an area without some sort of precise boundary (e.g., sharpening a center of an apple but not all of it), transition module 116 may instead determine that a larger transition area, or multiple transition areas stepping down the parameter level of the enhancement is appropriate.

At 806, the selected area of the photographic image is enhanced by applying the parameter value of the parameter map area to the selected area of the photographic image. As noted, the transition area may also be enhanced, though often at a lesser level of enhancement, such as one determined through interpolation of the parameter value with a parameter value for a neighboring area. Applying and enhancing can be performed by enhancement module 110 in real time as the selection of the area is received, though this is not required.

Optionally, at 808, method 800 can be repeated for multiple selected areas or all or substantially all of the photographic image. This repetition can also include multiple different image enhancements, using one or multiple parameter maps. Thus, at 802 a selection can be received for a global enhancement for all or substantially all of the photographic image rather than a selected area. One example selection manner is shown in FIG. 6 at spread control 606. Spread control 606 enables selection to apply an enhancement to all or substantially all of the photographic image, which may then be altered if desired, whether globally or on selection of an area as noted above. After selected of the global enhancement, enhancement module (repeating block 804), applies a second parameter value to all of substantially all of the photographic image. This can be performed through the same or a different parameter map Enhancement module 110 may then, repeating block 806, enhance all or substantially all of the photographic image by applying the second parameter value to the photographic image. Thus, methods 800 may operate to perform enhancements to selected areas and enhancements to all of a photographic image as part of one enhancement session with a user.

Furthermore, the techniques may record a history associated with the parameter map or maps. This history can indicate an order and location of enhancements, such as an enhancement to a most-recently selected area, various prior enhancements to areas, and a prior global enhancement. This history enables enhancement module 110 to reverse or alter enhancements, such as by altering a most-recent enhancement to have a lesser parameter and a prior enhancement to have more.

To perform operations of method 800, enhancement module 110 may use a same parameter map for multiple enhancements (parameter map 122 of FIG. 1), in which case a parameter map is used that has multiple parameter map areas. Alternatively, enhancing multiple selected areas can be performed through multiple respective maps, such as in separate stages. As noted, these areas can be the same with different enhancements or different with same or different enhancements, whether or not they overlap.

In performing these image enhancements, enhancement module 110 may apply a parameter value to a selected area through application to a portion of a pre-enhancement data file for the photographic image without altering or destroying that file, which may be an original data file or a previously enhanced data file. By so doing, the data file for the photographic image can be maintained while still permitting image enhancement.

Example Computing Device

Figure 10:
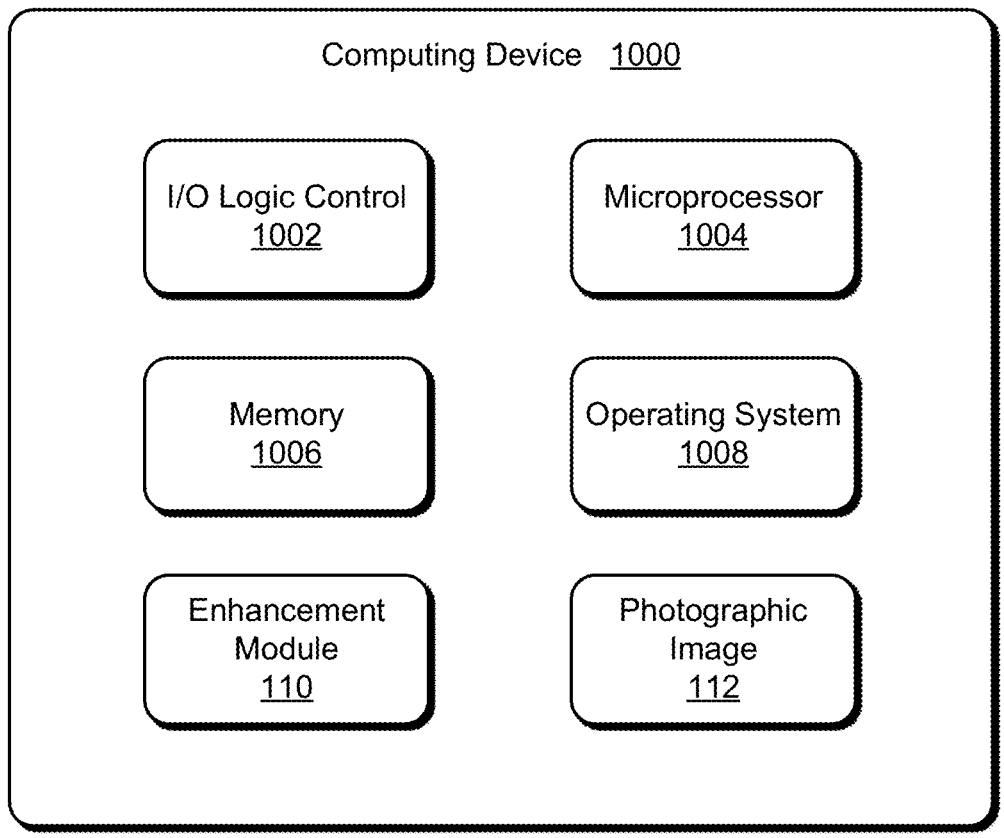
FIG. 10 illustrates an example computing device for implementing embodiments of the techniques described herein.

FIG. 10 illustrates an example computing device 1000, which can implement various embodiments described above. A computing device can be implemented in, or be, a fixed or mobile device of various types. Computing device 1000 can be integrated with electronic circuitry, a microprocessor, memory, input-output (I/O) logic control, communication interfaces and components, other hardware, firmware, and/or software needed to run an entire computing device (e.g., computing device 102 of FIG. 1). Computing device 1000 can also include an integrated data bus (not shown) that couples the various components of the computing device for data communication between the components. A device that includes computing device 1000 can also be implemented with many combinations of differing components.

In this example, computing device 1000 includes various components such as an input-output (I/O) logic control 1002 (e.g., to include electronic circuitry) and a microprocessor 1004 (e.g., any of a microcontroller or digital signal processor). Computing device 1000 also includes a memory 1006, which can be any type of random access memory (RAM), a low-latency nonvolatile memory (e.g., flash memory), read only memory (ROM), and/or other suitable electronic data storage. Computing device 1000 can also include various firmware and/or software, such as an operating system 1008, which can be computer-executable instructions maintained by memory 1006 and executed by microprocessor 1004. Computing device 1000 can also include other various communication interfaces and components, wireless LAN (WLAN) or PAN (WPAN) components, other hardware, firmware, and/or software.

Computing device 1000 includes enhancement module 110 and photographic image 112, and may include various other components of FIG. 1 as well. Enhancement module 110, either independently or in combination with other entities, can be implemented as computer-executable instructions maintained by memory 1006 and executed by microprocessor 1004 to implement various embodiments and/or features described herein, such as area-dependent image enhancement Enhancement module 110 may also be provided integral with other entities of the computing device. Alternatively or additionally, enhancement module 110 and the other components can be implemented as hardware, firmware, fixed logic circuitry, or any combination thereof that is implemented in connection with the I/O logic control 1002 and/or other signal processing and control circuits of computing device 1000.

Although the subject matter has been described in language specific to structural features and/or methodological operations, the subject matter defined in the appended claims is not necessarily limited to the specific features or operations described above, including orders in which the operations are performed.

What is claimed is:

1. A computer-implemented method comprising:
receiving, by a computing device through movement of a spatially-variable implement over an image, an area over the image;
receiving, by the computing device through selection of an image-enhancement selectable control, a parameter value for an enhancement of an appearance of the image at the area;
altering, by the computing device based on the parameter value selected through the image-enhancement selectable control, the appearance of the image at the area using the enhancement;
recording, by the computing device, a history of enhancements associated with the image, the history including the enhancement, the area, and the parameter value;
receiving, by the computing device, an input to select the enhancement from the history of enhancements;
receiving, by the computing device, an alteration input to alter the area or the parameter value of the enhancement based on the input; and
altering, by the computing device, the area or the parameter value of the enhancement based on the alteration input through use of the history.

2. The method of claim 1, wherein the spatially-variable implement includes a visual pointer, the visual pointer moving during the receiving of the movement over the image.

3. The method of claim 1, wherein the enhancement blurs, sharpens, de-noises, increases color contrast, decreases color contrast, brightens, darkens, increases or decreases color hue, increases or decreases color saturation, converts to color, converts to black and white, or converts to sepia the image at the area.

4. The method of claim 1, wherein the recording further comprises indicating a location of the enhancement to the area, a prior enhancement to other areas, or a prior global enhancement.

5. The method of claim 1, further comprising altering the area by enlarging or reducing a size of the area based on an edge, border, or visual element detected within the image, and wherein the enhancing the image at the area enhances the image at the altered area.

6. The method of claim 1, wherein the enhancing the appearance of the image at the area uses a parameter map corresponding to the image, the parameter map having a parameter value corresponding to the area, the parameter value updated on the parameter map in real time as the movement of the spatially variable implement is received.

7. The method of claim 1, wherein the enhancement of the appearance of the image at the area is temporarily applied without altering an original image file for the image.

8. A computer-implemented method comprising:
  receiving, by a computing device, selection of an area of an image to enhance with an enhancement;
  applying, by the computing device to a parameter map corresponding to the image, a parameter value to a parameter map area corresponding to the area of the image;
  enhancing, by the computing device, an appearance of the area of the image by applying the parameter value of the parameter map area to the area of the image without permanently altering the image, itself;
  recording, by the computing device, a history associated with the parameter map, the history indicating the enhancement, the area, and the parameter value;
  receiving, by the computing device, an input to select the enhancement from the history;
  receiving, by the computing device, an alteration input to alter the parameter value or the area of the enhancement; and
  altering, by the computing device, the appearance of the image using the enhancement based on the alteration input through use of the history and the parameter map.

9. The method of claim 8, wherein the recording further comprises indicating a location of the enhancement to the area.

10. The method of claim 8, wherein the applying and enhancing are performed in real time as the selection is received.

11. The method of claim 8, wherein the parameter map is a first parameter map and further comprising:
  receiving selection of an entirety of the image;
  applying, to a second parameter map corresponding to the image, a second parameter value to the entirety of the image; and
  enhancing the entirety of the image by applying the second parameter value of the second parameter map to the entirety of the image.

12. The method of claim 11, wherein the first parameter map and the second parameter map are included on a single map having the first parameter map area and the second parameter map areas.

13. The method of claim 8, wherein the selection of the area is shown by a visual indicator applied in real time as the selection is received.

14. The method of claim 8, wherein applying the parameter value to the area applies the parameter value to a portion of a pre-enhancement data file for the image.

15. The method of claim 8, wherein the selection of the area of the image is received through a touch-enabled mobile-device display on which the image is presented and through movement of a spatially-variable implement over the image.

16. One or more non-transitory computer-readable media having instructions stored thereon that, responsive to execution by one or more computer processors, perform operations comprising:
  providing an image-enhancement selectable control through a user interface presented on a display, the image-enhancement selectable control having multiple, selectable parameter values for an enhancement to an area of an image;
  receiving, through selection of the image-enhancement selectable control, a selected one of the multiple selectable parameters values for the enhancement to the area of the image;
  responsive to the selection of the selected parameter value, enhancing the area of the image based on the selected parameter value;
  recording a history associated with the image, the history indicating the enhancement, the parameter value, and the area;
  receiving an input to select the enhancement from the history;
  receiving an alteration input to alter the area or the parameter value of the enhancement; and
  altering the area or the parameter value of the selected enhancement based on the alteration input through use of the history.

17. The media of claim 16, wherein the enhancement is a first enhancement and wherein the operations further comprise repeating the providing, receiving, and enhancing, the providing for a second area of the image, the receiving for a second selected parameter value for a second image enhancement, the second image enhancement different than the first image enhancement, and the enhancing the second area based on the second selected parameter value and according to the second image enhancement different than the first image enhancement.

18. The media of claim 16, wherein the operations further comprise presenting a display region, the display region selectable to move freely over the image, the display region showing an un-enhanced, prior enhanced, or alternative enhancement within the display region.

19. The media of claim 18, wherein the operations further comprise enabling selection to alter the selected parameter value and, responsive to receiving an alteration to the selected parameter value, enhancing the area of the image based on the altered, selected parameter value.

20. The media of claim 19, wherein the alteration input is received in real time and the enhancing the area based on the altered, selected parameter value is presented in real time.

* * * * *

UNITED STATES PATENT AND TRADEMARK OFFICE
CERTIFICATE OF CORRECTION

PATENT NO. : 10,481,774 B2  
APPLICATION NO. : 15/291462  
DATED : November 19, 2019  
INVENTOR(S) : Zhe Lin et al.

It is certified that error appears in the above-identified patent and that said Letters Patent is hereby corrected as shown below:

In the Claims

Column 11, Line 60, delete "areas.", insert --area.--, therefor.

Signed and Sealed this  
Twenty-eighth Day of January, 2020

Andrei Iancu  
*Director of the United States Patent and Trademark Office*